United States Patent
Nonaka

(10) Patent No.: US 8,901,233 B2
(45) Date of Patent: Dec. 2, 2014

(54) FLAME RETARDANT, FLAME-RETARDANT RESIN COMPOSITION, AND INSULATED WIRE

(75) Inventor: Tsuyoshi Nonaka, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/513,916

(22) PCT Filed: Feb. 2, 2011

(86) PCT No.: PCT/JP2011/052093
§ 371 (c)(1),
(2), (4) Date: Jun. 5, 2012

(87) PCT Pub. No.: WO2011/096410
PCT Pub. Date: Aug. 11, 2011

(65) Prior Publication Data
US 2012/0234576 A1    Sep. 20, 2012

(30) Foreign Application Priority Data
Feb. 3, 2010   (JP) .................................. 2010-022009

(51) Int. Cl.
| H01B 7/295 | (2006.01) |
| H01B 3/30 | (2006.01) |
| C08K 3/22 | (2006.01) |
| C08L 23/10 | (2006.01) |
| C08L 23/04 | (2006.01) |
| C08L 33/06 | (2006.01) |
| C08K 9/08 | (2006.01) |
| C09K 21/02 | (2006.01) |

(52) U.S. Cl.
CPC ................ C09K 21/02 (2013.01); H01B 7/295 (2013.01); C08K 9/08 (2013.01); C08K 2003/2224 (2013.01)
USPC ........... 524/543; 524/436; 524/524; 524/556; 174/110 R

(58) Field of Classification Search
CPC . C08L 23/10; C08L 23/0853; C08L 23/0815; C08L 2201/02; C08K 2003/2217; C08K 2003/2224; Y10S 428/94
USPC ....................... 524/543, 436, 524; 174/110 R
See application file for complete search history.

(56) References Cited

U.S. PATENT DOCUMENTS

| 5,139,875 A | 8/1992 | Metzemacher et al. |
| 6,500,882 B1 * | 12/2002 | Hiraishi et al. ............... 523/205 |
| 2010/0025070 A1 | 2/2010 | Nonaka et al. |

FOREIGN PATENT DOCUMENTS

| EP | 1 262 838 A1 | 12/2002 |
| JP | A-151464 | 7/1987 |
| JP | A-2-293316 | 12/1990 |
| JP | A-3-263440 | 11/1991 |
| JP | A-7-161230 | 6/1995 |
| JP | A-2002-363349 | 12/2002 |
| JP | A-2004-83612 | 3/2004 |
| JP | A-2004-189905 | 8/2004 |
| JP | 2010-006986 A * | 1/2010 |
| JP | 2010006986 A * | 1/2010 |
| JP | A-2010-6986 | 1/2010 |
| WO | WO/2008/062820 A1 | 5/2008 |

OTHER PUBLICATIONS

PCT/JP2011/052093—Written Opinion of the International Searching Authority—Sep. 18, 2012.*
JP2010-006986A—machine translation.*
Mitsui Chemicals Hi-WAXtm—low molecular weight polyolefin specifications—http://www.mitsuichem.com/service/polyurethane/coatings/hi-wax/spec.htm.*
Apr. 19, 2011 International Search Report issued in International Patent Application No. PCT/JP2011/052093 (with translation).
Sep. 2, 2013 Office Action issued in Chinese Patent Application No. 201180008251.9 (with translation).
Mar. 31, 2014 Office Action issued in Chinese Application No. 201180008249.1 (with English Translation).
Mar. 12, 2014 Office Action in German Patent Application No. 11 2011 100 433.8 (with translation).
Apr. 22, 2014 Office Action issued in Japanese Patent Application No. 2010-022009 w/translation.
May 7, 2014 Office Action issued in Chinese Patent Application No. CN201180008251.9 with translation.
Sep. 5, 2014 Office Action issued in Chinese Patent Application No. 201180008251.9 w/translation.
Dec. 18, 2013 Office Action issued in Chinese Patent Application No. 201180008249.1 (with translation).
Jan. 31, 2014 Office Action issued in U.S. Appl. No. 13/513,919.
Aug. 14, 2014 Office Action issued in German Patent Application No. 11 2011 100 433.8 w/translation.

* cited by examiner

Primary Examiner — Ling Choi
Assistant Examiner — Ronald Grinsted
(74) Attorney, Agent, or Firm — Oliff PLC

(57) ABSTRACT

Provided are a flame retardant, a flame-retardant resin composition and an insulated wire that have favorable low-temperature characteristics, excellent cold resistance and high productivity. The insulated wire includes a conductor that is insulation-coated with the flame-retardant resin composition that contains the flame retardant that contains magnesium hydroxide and a surface treatment agent with which the magnesium hydroxide is surface-treated, wherein the surface treatment agent has a weight-average molecular weight of 10000 or less, and at least a base resin.

16 Claims, No Drawings

FLAME RETARDANT, FLAME-RETARDANT RESIN COMPOSITION, AND INSULATED WIRE

TECHNICAL FIELD

The present invention relates to a flame retardant, a flame-retardant resin composition and an insulated wire, and more specifically relates to a flame retardant, a flame-retardant resin composition and an insulated wire that are favorably used for automobile or electrical/electronic appliance.

BACKGROUND ART

A variety of properties such as a mechanical property, flame retardancy, heat resistance and cold resistance are required of parts and insulation materials used for automobile or electrical/electronic appliance. Conventionally, a polyvinyl chloride compound, or a compound containing a halogenous flame retardant that contains bromine atoms or chlorine atom in the molecules are mainly used for those materials.

The materials described above have possibilities to generate a great amount of corrosive gas during incineration disposal. For this reason, a non-halogenous flame-retardant material is proposed in PTL 1, which has no possibility to generate a corrosive gas. In addition, magnesium hydroxide that is surface-treated is proposed as a non-halogenous flame-retardant resin composition in PTL 2 to PTL 4.

CITATION LIST

Patent Literature

PTL 1: Patent JP 2004-83612
PTL 2: Patent JP 3339154
PTL 3: Patent JP 3636675
PTL 4: Patent JP 2004-189905

SUMMARY OF INVENTION

Technical Problem

A polyolefin resin filled with magnesium hydroxide is usually used for the conventionally-proposed non-halogenous flame-retardant material. However, this material has insufficient cold resistance. In addition, having unfavorable kneadability, this material does not have sufficient productivity.

The present invention is made in view of the problems described above, and an object of the present invention is to provide a flame retardant, a flame-retardant resin composition and an insulated wire that have excellent cold resistance and high productivity.

Solution to Problem

To achieve the objects and in accordance with the purpose of the present invention, a flame retardant of a preferred embodiment of the present invention contains magnesium hydroxide, and a surface treatment agent containing an organic polymer with which the magnesium hydroxide is surface-treated, wherein the surface treatment agent has a weight-average molecular weight of 10000 or less.

It is preferable that the surface treatment agent defines a hydrocarbon resin, that the surface treatment agent contains at least one of material selected from the group consisting of polyethylene, polypropylene, an ethylene-ethyl acrylate copolymer, an ethylene-vinyl acetate copolymer, and derivatives thereof, that the content of the surface treatment agent in the flame retardant is 0.1 to 10% by mass, and that the magnesium hydroxide (yet to be surface-treated) has an average particle size of 0.1 to 20 μm.

In another aspect of the present invention, a flame-retardant resin composition of a preferred embodiment of the present invention contains the flame retardant, and a base resin at least to which the flame retardant is added.

Yet, in another aspect of the present invention, an insulated wire of a preferred embodiment of the present invention includes a conductor, and a coating member containing the flame-retardant resin composition, with which the conductor is insulation-coated.

Advantageous Effects of Invention

Containing the magnesium hydroxide that is surface-treated with the surface treatment agent having the weight-average molecular weight of 10000 or less, the flame retardant of the present embodiment of the present invention has favorable dispersibility and excellent cold resistance. In addition, if the flame retardant of the present embodiment of the present invention is included in a resin composition, a sufficient discharge amount of the composition is achieved when discharging the composition from a kneader, so that the flame retardant has excellent productivity.

Because the flame-retardant resin composition of the present embodiment of the present invention contains the base resin to which the flame retardant is added, a molded product made from the composition has excellent productivity and excellent cold resistance.

Including the conductor, and the coating member containing the flame-retardant resin composition with which the conductor is insulation-coated, the insulated wire of the present embodiment of the present invention has excellent productivity and excellent cold resistance

DESCRIPTION OF EMBODIMENTS

A detailed description of preferred embodiments of the present invention will now be provided. A flame retardant of the present embodiment of the present invention contains magnesium hydroxide that is surface-treated with a surface treatment agent. Synthesized magnesium hydroxide that is chemically synthesized, or natural magnesium hydroxide that is prepared by pulverizing a natural mineral is used as the magnesium hydroxide.

Examples of the synthesized magnesium hydroxide include synthesized magnesium hydroxide that is prepared by crystal growing fine particles of magnesium hydroxide that is obtained by reacting magnesium chloride made from seawater and calcium hydroxide in an aqueous solution, and synthesized magnesium hydroxide that is prepared by a method in which ion bittern is used.

Examples of the natural magnesium hydroxide include natural magnesium hydroxide that is prepared preferably by pulverizing natural brucite in a dry pulverizing method using a pulverizer, a crusher or a ball mill, or by pulverizing natural brucite in a wet pulverizing method, and then sizing the natural brucite so as to have a desired average particle size with the use of a cyclone machine or a screen as necessary. The dry pulverizing method is preferably used.

The magnesium hydroxide (yet to be surface-treated) has an average particle size of 0.1 to 20 μm, preferably 0.2 to 10 μm, and more preferably 0.5 to 5 μm. If the average particle size is less than 0.1 μm, secondary cohesion of particles tends to occur, which decreases a mechanical property of a composition to be made. If the average particle size is more than 20 μm, when a flame retardant resin composition to which the magnesium hydroxide is added is used for a wire coating member, a produced wire could have unfavorable appearance.

A resin having a weight-average molecular weight of 10000 or less is used for the surface treatment agent. The weight-average molecular weight of the surface treatment agent defines a weight-average molecular weight measured by GPC on polystyrene conversion. If the weight-average molecular weight of the surface treatment agent is more than 10000, the weight-average molecular weight is too large, which raises the possibility of nonuniform coating on the magnesium hydroxide particles when the magnesium hydroxide is surface-treated. To the contrary, because the weight-average molecular weight of the surface treatment agent of the present invention is 10000 or less, there is no possibility as described above. As a result, cohesion of the magnesium hydroxide particles does not occur when coating is performed on the particles, which allows uniform coating on the magnesium hydroxide particles. Thus, particles of the flame retardant can be easily microparticulated. If the microparticulation of the flame retardant is not performed well, dispersibility of the flame retardant particles declines and causes cohesion of the flame retardant, particles. In such a case, when a flame retardant resin composition is produced by adding the flame retardant to a base resin, or when a molded product is produced of the flame retardant resin composition, discharge pressure increases to degrade workability in producing or molding the composition. To the contrary, in the present invention, the surface treatment agent is finely coated on the flame retardant, so that the flame retardant can be easily microparticulated, which can improve dispersibility of the flame retardant in the composition. As a result, while workability in producing the flame retardant resin composition or in molding is not degraded, the effect of improving productivity of the composition is obtained.

The lower limit of the weight-average molecular weight of the surface treatment agent is preferably 500. If the weight-average molecular weight of the surface treatment agent is less than 500, the surface treatment agent could come off the surface of the magnesium hydroxide at the time of processing. The weight-average molecular weight of the surface treatment agent is more preferably in the rage of 1000 to 9000.

A melting point of the surface treatment agent is preferably in the range of 50 to 200 degrees C., and more preferably in the range of 60 to 190 degrees C. in view of coating property in performing coating. In particular, when a flame retardant that is prepared by surface-treating synthesized magnesium hydroxide that defines magnesium hydroxide with a surface treatment agent having a relatively high melting point is added to a resin to obtain a resin composition, the resin composition can be prevented from foaming in pelletizing. Thus, a molded product such as a. wire coating member having favorable surface appearance can be obtained.

The surface treatment agent preferably has a degree of crystallization of 60% or more, and more preferably has a degree of crystallization of 80% or more. The degree of crystallization defines a value that is measured by an X-ray diffraction method. The surface treatment agent having a larger degree of crystallization improves more in dispersibility, and more in cold resistance.

The content of the surface treatment agent in the flame retardant is usually 0.001 to 20% by mass, more preferably 0.1 to 10% by mass, and yet more preferably 0.2 to 8% by mass. If the content is small, the effect of improving cold resistance and productivity of a flame retardant resin composition containing the flame retardant is liable to get lowered. If the content is too large, an increase in cost is caused while the effect of improving cold resistance and productivity of a flame retardant resin composition containing the flame retardant is not lowered very much.

A hydrocarbon resin such as a paraffinic resin and an olefin resin is preferably used as an organic polymer that is used as the surface treatment agent. Examples of the hydrocarbon resin include a homopolymer, a copolymer or a mixture of a-olefins such as 1-heptene, 1-octene, 1-nonene and 1-decene, polypropylene (PP), polyethylene (PE), an ethylene-ethyl acrylate copolymer (EEA), an ethylene-vinyl acetate copolymer (EVA), and derivatives thereof. It is essential only that the surface treatment agent should contain at least one of the resins described above.

Examples of the polyethylene include low density polyethylene, ultralow density polyethylene, linear low density polyethylene, high density polyethylene, and metallocene polymerized polyethylene. Examples of the polypropylene include atactic polypropylene, syndiotactic polypropylene, metallocene polymerized polypropylene, homopolymer polypropylene, and copolymer polypropylene.

The surface treatment agent may be modified by a modifying agent. Examples of the modification include acid modification such that a carboxylic group (acid) is introduced into the surface treatment agent using an unsaturated carboxylic acid or its derivative as the modifying agent. The surface treatment agent, if modified by acid, easily has an improved affinity for the surface of the magnesium hydroxide. Specific examples of the modifying agent include a maleic acid and a fumaric acid as the unsaturated carboxylic acid, and a maleic acid anhydride (MAH), a maleic acid monoester and a maleic acid diester as the derivative. Among them, the maleic acid and the maleic acid anhydride are preferably used. They may be used singly or in combination.

The acid is introduced into the surface treatment agent by a graft polymerization method or a direct polymerization method. The amount of the used acid, on a percentage by mass basis of the used modifying agent, is preferably 0.1 to 20% by mass with respect to the polymers, more preferably 0.2 to 10% by mass, and yet more preferably 0.2 to 5% by mass. If the amount of the used acid is smaller, the effect of improving the affinity of the surface treatment agent for the magnesium hydroxide tends to be lessened. On the other hand, if the amount is large, the surface treatment could undergo self-polymerization, and accordingly the effect of improving the affinity of the surface treatment agent for the magnesium hydroxide tends to be lessened.

A method for surface-treating the magnesium hydroxide with the surface treatment agent is not limited specifically. A variety of surface treatment methods can be used. Examples of the method for surface-treating the magnesium hydroxide include a surface treatment method such that magnesium hydroxide is synthesized in advance to have a given size of particles, and then the magnesium hydroxide is blended with a surface treatment agent, and a surface treatment method such that a surface treatment agent is contained in magnesium hydroxide at the time of synthesizing the magnesium hydroxide. The surface treatment method is preferably a wet method using a solvent, or a dry method using no solvent. In using the wet method, examples of the solvent include an aliphatic hydrocarbon such as pentane, hexane and heptane, and an aromatic hydrocarbon such as benzene, toluene and xylene. In addition, examples of the method for surface-treating the magnesium hydroxide include a surface treatment method such that a surface treatment agent is added to magnesium hydroxide that is yet to be surface-treated and a base resin at the time of preparing a flame-retardant resin composition, and then the magnesium hydroxide is surface-treated at the time of kneading the composition.

Next, a description of a flame retardant resin composition of a preferred embodiment of the present invention will be provided. The flame retardant resin composition of the preferred embodiment of the present invention contains a base resin, and the flame retardant that contains the magnesium hydroxide that is surface-treated with the surface treatment agent specified as described above, where the flame retardant is added at least to the base resin. The base resin contained in the flame retardant resin composition is preferably a so-called non-halogenous plastic or rubber that contains no halogen element such as chlorine and bromine. Polyolefin and a styrene copolymer are preferably used as a material for the base resin. Specific examples thereof include polyethylene, polypropylene, ethylene-propylene rubber and a styrene-ethylene butylene-styrene block copolymer.

The content of the flame retardant in the flame retardant resin composition is preferably 30 to 250 parts by mass, and more preferably 50 to 200 parts by mass with respect to 100 parts by mass of the base resin. If the content is less than 30 parts by mass, the flame retardant resin composition could not have sufficient flame retardancy. On the other hand, if the content is more than 250 parts by mass, the flame retardant resin composition could not have a sufficient mechanical property.

It is essential only that the flame retardant resin composition should contain at least the base resin and the flame retardant; however, the flame retardant resin composition may further contain another additive such as an antioxidant as necessary within a range of not impairing its properties. Examples of the additive include a generally-used coloring agent, filler, antioxidant and antiaging agent that are used preferably for a wire coating member.

The flame retardant resin composition can be prepared by melting and kneading the ingredients with the use of a known kneader such as a Banbury mixer, a pressure kneader, a kneading extruder, a twin screw extruder and a roll. In melting and kneading, it is preferable that the base resin is charged and stirred in advance in the kneader, and then the flame retardant is added to the base resin being stirred, or that the flame retardant is charged and stirred in advance in the kneader, and then the base resin is added to the flame retardant being stirred. It is also preferable that the flame retardant and the base resin are dry blended by using a tumbler before kneading, and then transferred into the kneader to knead. After kneading, the composition is taken out of the kneader. The composition is preferably pelletized using a pelletizing machine.

The flame retardant resin composition can be used for parts and insulation materials used for automobile or electrical/electronic appliance, and can be more preferably used for a material for an insulation layer of an insulated wire.

Next, a description of an insulated wire of a preferred embodiment of the present invention will be provided. The insulated wire of the preferred embodiment of the present invention includes a conductor, and a coating member containing the flame-retardant resin composition described above, with which the conductor is insulation-coated. The insulated wire is produced such that the flame-retardant resin composition is extruded by an extrusion molding machine, which is used for producing a general insulated wire, so as to insulation-coat the conductor, by which an insulation layer made from the flame-retardant resin composition is formed around the conductor. A conductor that is used for a general insulated wire is used for the conductor of the insulated wire of the preferred embodiment of the present invention. The diameter of the conductor, and the thickness of the insulation layer of the insulated wire of the preferred embodiment of the present invention, which are not limited specifically, may be determined depending on the intended use. The insulation layer may be a single layer, or a multilayer.

EXAMPLE

A description of the present invention will now be specifically provided with reference to Examples and Comparative Examples.

Example 1

[Preparation of flame retardant]

A flame retardant (referred to as a surface-treated magnesium hydroxide in Tables 1 and 2) was prepared as follows. While magnesium hydroxide [manuf.: NIHON KAISUI CO. LTD., magnesium hydroxide for industrial use (having an average particle size of 10 μm) was being stirred in a super mixer at 200 degrees C., polypropylene having a weight-average molecular weight 1000 [manuf.: CLARIANT (JAPAN) K.K., trade name: 6102] that defined a surface treatment agent was gradually poured in the mixer over about 5 minutes. Then, the mixture was stirred for about another 20 minutes. The content of the surface treatment agent in the flame retardant was 0.1% by mass.

In the present embodiment, all the weight-average molecular weights define weight-average molecular weights measured by GPC on polystyrene conversion. The measurement conditions of GPC are described below.

Column [manuf.: TOSOH CORPORATION, trade name: TSK-gel]

Measurement temperature: 100 degrees C.

Solvent: xylene

[Preparation of Flame-Retardant Resin Composition]

Pellets of a flame-retardant resin composition were prepared by kneading 100 parts by mass of the flame retardant described above, 100 parts by mass of a polypropylene resin [Manuf.: JAPAN POLYPROPYLENE CORPORATION, trade name: EC7] that defined a base resin, and 1 part by mass of an antioxidant [Manuf.: CIBA SPECIALTY CHEMICALS INC., trade name: "IRGANOX 1010"] at 200 degrees C., and pelletizing the mixture using a pelletizing machine. A discharge amount of the pellets of flame-retardant resin composition being produced was measured. The result is shown in Table 1.

[Preparation of Insulated Wire]

An insulated wire was prepared by extrusion-coating a conductor (having a cross sectional area: 0.5 $mm^2$), which was a soft-copper strand prepared by bunching seven soft copper wires, with an insulator made from the pellets of the prepared composition to have a thickness of 0.2 mm with the use of a twin-screw kneader and an extrusion molding machine. The obtained insulated wire was subjected to a cold-resistance test. The test result is shown in Table 1. The test procedure is described below.

[Test Procedure of Cold-Resistance Test]

The cold-resistance test was performed in accordance with the JIS 03055. To be specific, the prepared insulated wire was cut into a test specimen 38 mm long. Five test specimens were set in a cold-resistance test machine and hit with a striking implement while being cooled to a given temperature, and the temperature at the time when all of the five test specimens were broken was determined as the cold-resistance temperature of the insulated wire.

Examples 2 to 7 (Table 1), Comparative Examples 1 to 7 (Table 2)

Insulated wires were obtained by preparing flame retardants and flame-retardant resin compositions in the same manner as Example 1, except that the kinds and the contents of surface treatment agents contained in the flame retardants were set as described below. Discharge amounts of the flame-retardant resin compositions being produced were measured. The insulated wires were subjected to the cold-resistance test. The test results are shown in Tables 1 and 2.

Example 2

Polypropylene [manuf.: MITSUI CHEMICALS, INC., trade name: NP055]
Weight-average molecular weight: 5000
Content: 10% by mass Example 3

Polyethylene [manuf.: MITSUI CHEMICALS, INC., trade name: 720P]
Weight-average molecular weight: 6000
Content: 0.1% by mass Example 4

Polyethylene [manuf.: MITSUI CHEMICALS, INC., trade name: 800P]
Weight-average molecular weight: 8000
Content: 10% by mass Example 5

Ethylene-ethyl acrylate copolymer [manuf.: JAPAN POLYETHYLENE CORPORATION, trade name: A6200]
Weight-average molecular weight: 5000
Content: 5% by mass Example 6

Ethylene-vinyl acetate copolymer [manuf.: JAPAN POLYETHYLENE CORPORATION, trade name: LV151]
Weight-average molecular weight: 3000
Content: 5% by mass Example 7

Metallocene polymerized polyethylene [manuf.: JAPAN POLYETHYLENE CORPORATION, trade name: KJ740T]
Weight-average molecular weight: 2000
Content: 5% by mass Comparative Example 1

Polypropylene [manuf.: CLARIANT (JAPAN) K.K., trade name: 2602]
Weight-average molecular weight: 25000
Content: 1.0% by mass Comparative Example 2

Polypropylene [manuf.: CLARIANT (JAPAN) K.K., trade name: 1602]
Weight-average molecular weight: 15000
Content: 12% by mass Comparative Example 3

Polyethylene [manuf.: CLARIANT (JAPAN) K.K., trade name: 220]
Weight-average molecular weight: 13000
Content: 0.08% by mass Comparative Example 4

Polyethylene [manuf.: CLARIANT (JAPAN) K.K., trade name: 230]
Weight-average molecular weight: 20000
Content: 12% by mass Comparative Example 5

Stearic acid [manuf.: NOF CORPORATION, trade name: NAA173A]
Content: 5% by mass

Comparative Example 6

Zinc stearate [manuf.: NOF CORPORATION, trade name: UNISTAR]
Content: 5% by mass Comparative Example 7

Methacrylate silane [manuf.: SHIN-ETSU CHEMICAL CO., Ltd., trade name: KBM502]
Content: 5% by mass

TABLE 1

|  | Example | | | | | | |
| --- | --- | --- | --- | --- | --- | --- | --- |
|  | 1 | 2 | 3 | 4 | 5 | 6 | 7 |
| Ingredients of composition (parts by mass) | | | | | | | |
| Polypropylene resin | 100 | 100 | 100 | 100 | 100 | 100 | 100 |
| Surface-treated magnesium hydroxide | 100 | 100 | 100 | 100 | 100 | 100 | 100 |
| Antioxidant | 1 | 1 | 1 | 1 | 1 | 1 | 1 |
| Surface treatment agent for magnesium hydroxide | | | | | | | |
| Type | PP | PP | PE | PE | EEA | EVA | Metallocene PE |

TABLE 1-continued

|  | Example | | | | | | |
|---|---|---|---|---|---|---|---|
|  | 1 | 2 | 3 | 4 | 5 | 6 | 7 |
| Weight-average molecular weight | 1000 | 5000 | 6000 | 8000 | 5000 | 3000 | 2000 |
| Content(% by mass) | 0.1 | 10 | 0.1 | 10 | 5 | 5 | 5 |
| Test result |  |  |  |  |  |  |  |
| Cold-resistance temperature of insulated wire (° C.) | −30 | −40 | −35 | −40 | −30 | −25 | −30 |
| Discharge amount of composition (kg/h) | 500 | 700 | 600 | 700 | 600 | 550 | 550 |

TABLE 2

|  | Comparative Example | | | | | | |
|---|---|---|---|---|---|---|---|
|  | 1 | 2 | 3 | 4 | 5 | 6 | 7 |
| Ingredients of composition (parts by mass) |  |  |  |  |  |  |  |
| Polypropylene resin | 100 | 100 | 100 | 100 | 100 | 100 | 100 |
| Surface-treated magnesium hydroxide | 100 | 100 | 100 | 100 | 100 | 100 | 100 |
| Antioxidant | 1 | 1 | 1 | 1 | 1 | 1 | 1 |
| Surface treatment agent for magnesium hydroxide |  |  |  |  |  |  |  |
| Type | PP | PP | PE | PE | Stearic acid | Zinc stearate | Methacrylate silane |
| Weight-average molecular weight | 25000 | 15000 | 13000 | 20000 | — | — | — |
| Content(% by mass) | 1.0 | 12 | 0.08 | 12 | 5 | 5 | 5 |
| Test result |  |  |  |  |  |  |  |
| Cold-resistance temperature of insulated wire (° C.) | −10 | −15 | −10 | −10 | −5 | −5 | −5 |
| Discharge amount of composition (kg/h) | 200 | 250 | 200 | 200 | 150 | 100 | 150 |

As shown in Table 1, the insulated wires of Examples 1 to 7 had cold-resistance temperatures of −25° C. to −40° C., that is, they had favorable cold-resistance properties. In addition, the discharge amounts of the flame-retardant resin compositions of Examples 1 to 7 were 500 kg/h or more, which were favorable. In contrast, as shown in Table 2, the insulated wires of Comparative Examples 1 to 7 had cold-resistance temperatures of −15° C. to −5° C., which are inferior to the insulated wires according to Examples 1 to 7. In addition, the discharge amounts of the flame-retardant resin compositions of Comparative Examples 1 to 7 were 250 kg/h or less, which are inferior to the insulated wires of Examples 1 to 7.

Experimental Example 1

A test was performed to see the influence by degree of crystallization of a surface treatment agent in a flame retardant. An insulated wire was obtained by preparing a flame retardant and a flame-retardant resin composition in the same manner as Example 1, where, instead of using a same surface treatment agent as Example 1, polypropylene was used, which had a different degree of crystallization while having a weight-average molecular weight of of 1000 that is same as Example 1. The insulated wire was subjected to the cold-resistance test. The test result is shown in Table 3. As shown in Table 3, the weight-average molecular weight of the surface treatment agent contained in the flame retardant of Experimental Example 1 is same as that of Example 1; however, the degree of crystallization of the surface treatment agent contained in the flame retardant of Experimental Example 1 is 90%, which is higher than that of Example 1, which is 80%. As a result, while the insulated wire of Example 1 had the cold-resistance temperature of −30° C., the insulated wire of Experimental Example 1 had a cold-resistance temperature of −35° C. Thus, it is confirmed that as the degree of crystallization rises, the cold resistance is improved.

TABLE 3

|  | Properties of surface treatment agent | | Test result |
|---|---|---|---|
|  | Weight-average molecular weight | Degree of crystallization (%) | Cold-resistance temperature (° C.) |
| Example 1 | 1000 | 80 | −30 |
| Experimental Example 1 | 1000 | 90 | −35 |

The degrees of crystalization define values that are measured by an X-ray diffraction method. A measurement method of the degrees of crystallization by the X-ray diffraction method is described below.

[X-ray Diffraction Measurement Method]

X-ray diffracting device: [manuf.: RIGA=CO., LTD., trade name: RAD2C system]

Light source: Copper Kat ray

Diffraction angle 2θ: 10 to 70 degrees

[Method for Estimation of Degree of Crystallization]

Degrees of crystallization were obtained using the following formula based on integral intensity of diffraction peaks of a non-crystalline portion and a crystalline portion of the resins.

Degree of crystallization (%)=(integral intensity of crystalline portion/integral intensity of non-crystalline portion and crystalline portion)×100

The invention claimed is:

1. A flame retardant containing:
   magnesium hydroxide; and
   a surface treatment agent containing an organic polymer with which the magnesium hydroxide is surface-treated,
   wherein the surface treatment agent has a weight-average molecular weight of 500 to 3000, 6000, or 9000 to 10000.

2. The flame retardant according to claim 1, wherein the surface treatment agent comprises a hydrocarbon resin.

3. A flame-retardant resin composition containing:
   the flame retardant according to claim 2; and
   a base resin at least to which the flame retardant is added.

4. An insulated wire comprising:
   a conductor; and
   a coating member containing the flame-retardant resin composition according to claim 3, with which the conductor is insulation-coated.

5. The flame retardant according to claim 1, wherein the surface treatment agent contains at least one of material selected from the group consisting of polyethylene, polypropylene, an ethylene-ethyl acrylate copolymer, an ethylene-vinyl acetate copolymer, and derivatives thereof.

6. A flame-retardant resin composition containing:
   the flame retardant according to claim 5; and
   a base resin at least to which the flame retardant is added.

7. An insulated wire comprising:
   a conductor; and
   a coating member containing the flame-retardant resin composition according to claim 6, with which the conductor is insulation-coated.

8. The flame retardant according to claim 1, wherein the content of the surface treatment agent in the flame retardant is 0.1 to 10% by mass.

9. A flame-retardant resin composition containing:
   the flame retardant according to claim 8; and
   a base resin at least to which the flame retardant is added.

10. An insulated wire comprising:
    a conductor; and
    a coating member containing the flame-retardant resin composition according to claim 9, with which the conductor is insulation-coated.

11. The flame retardant according to claim 1, wherein the magnesium hydroxide has an average particle size of 0.1 to 20 μm.

12. A flame-retardant resin composition containing:
    the flame retardant according to claim 11; and
    a base resin at least to which the flame retardant is added.

13. An insulated wire comprising:
    a conductor; and
    a coating member containing the flame-retardant resin composition according to claim 12, with which the conductor is insulation-coated.

14. A flame-retardant resin composition containing:
    the flame retardant according to claim 1; and
    a base resin at least to which the flame retardant is added.

15. An insulated wire comprising:
    a conductor; and
    a coating member containing the flame-retardant resin composition according to claim 14, with which the conductor is insulation-coated.

16. A flame retardant containing:
    magnesium hydroxide; and
    a surface treatment agent containing an organic polymer with which the magnesium hydroxide is surface-treated,
    wherein the surface treatment agent has a weight-average molecular weight of 10000 or less, and
    wherein the surface treatment agent contains at least one of an ethylene-ethyl acrylate copolymer and an ethylene-vinyl acetate copolymer.

* * * * *